May 30, 1961 L. D. RUTTEN 2,986,360
AERIAL INSECTICIDE DUSTING DEVICE
Filed Oct. 13, 1958 3 Sheets-Sheet 1

Louis D. Rutten
INVENTOR.

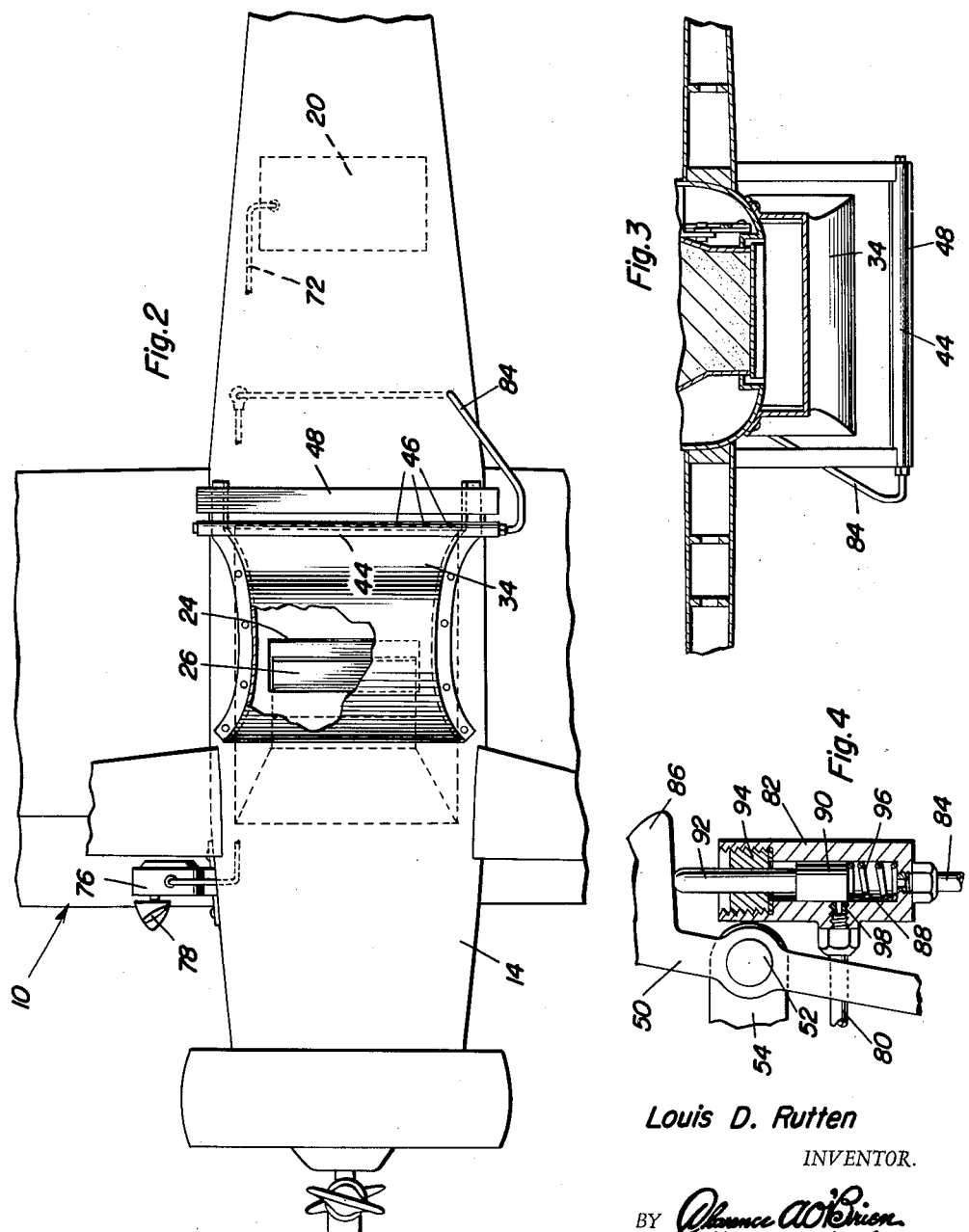

May 30, 1961 L. D. RUTTEN 2,986,360
AERIAL INSECTICIDE DUSTING DEVICE
Filed Oct. 13, 1958 3 Sheets-Sheet 3
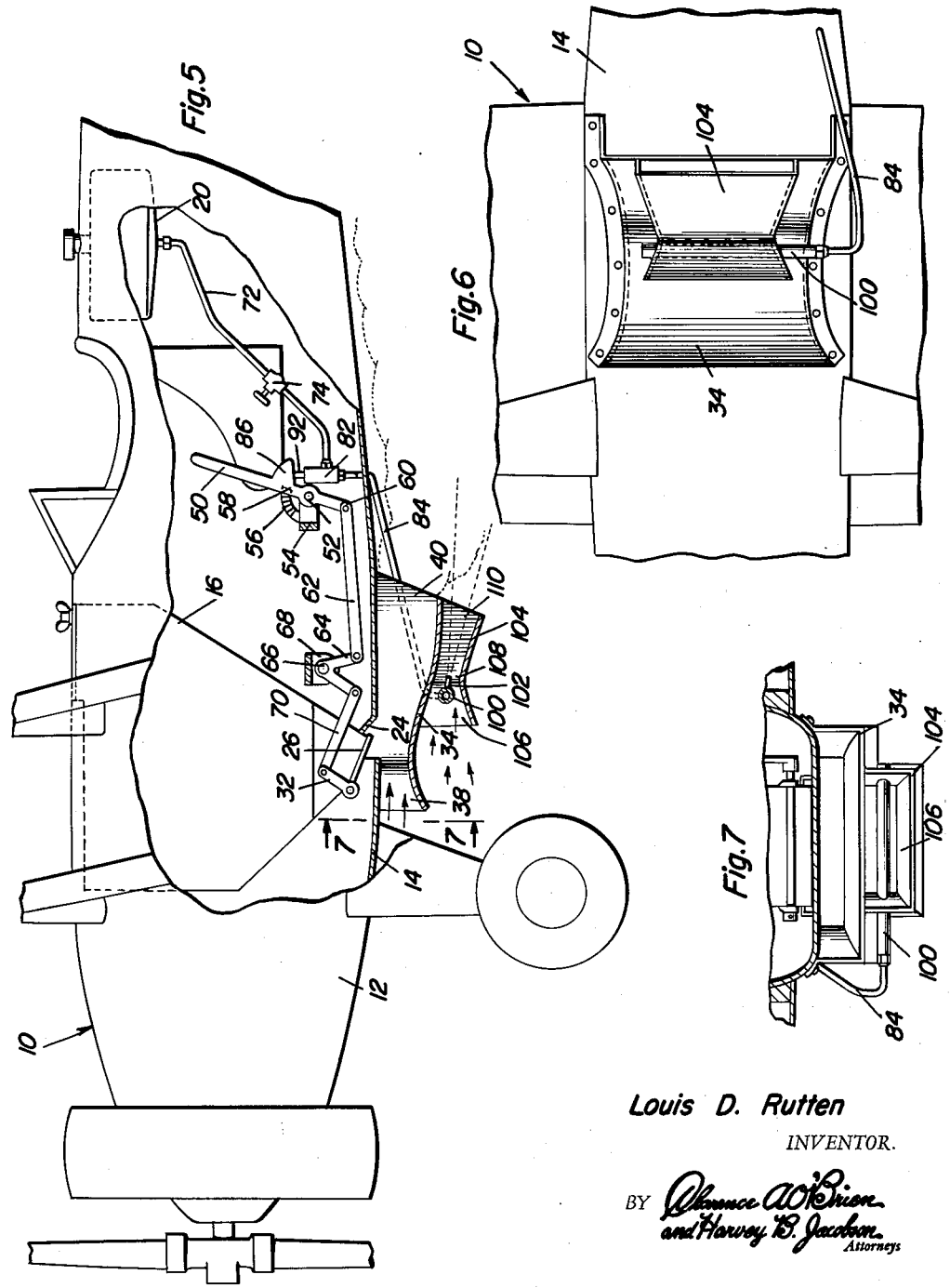
Louis D. Rutten
INVENTOR.

United States Patent Office 2,986,360
Patented May 30, 1961

2,986,360

AERIAL INSECTICIDE DUSTING DEVICE

Louis D. Rutten, P.O. Box 482, Havana, Fla.

Filed Oct. 13, 1958, Ser. No. 766,842

5 Claims. (Cl. 244—136)

This invention comprises a novel and useful aerial insecticide dusting device and more particularly relates to an apparatus mounted upon an aircraft in a novel and improved manner to facilitate and to more effectively dust crops with insecticides.

The primary object of this invention is to provide an improvement in the aerial spraying of insecticides upon crops.

A further object of the invention is to provide a means whereby a liquid insecticide and a powder, carried in separate containers by a plane, may be mixed to a desired degree of moisture as they are sprayed from the plane.

Another object of the invention is to eliminate labor and time customarily required for mixing a liquid insecticide and a powder or dust before they are loaded into a plane for spraying therefrom.

A further object of the invention is to provide for the separate feeding of a dust and a liquid insecticide from separate containers in a plane to thereby avoid clogging of the control valves and spray nozzles by the moistened dust passing therethrough.

A further object of the invention is to provide a means which will enable a variation in the proportion of the liquid insecticide and of the dust which are mixed during the spraying operation of the same from a plane.

A further object of the invention is to provide for more effective mixing of the dust and the liquid insecticide by separately atomizing each of these elements in an air stream after the elements are discharged from the plane, and then combining the separately atomized components by intermingling of the separate streams.

Another object of the invention is to provide a more compact and a more effective venturi construction whereby dust and a liquid insecticide may be separately mixed with air and then mixed with each other upon the exterior of the plane.

A still further object of the invention is to reduce the liability of danger or injury to pilots through their inhalation of the dust cloud dispersed in the air by the plane and from impaired visability from such dust clouds inasmuch as the pilot necessarily flies very low or close to the ground during dusting operations, this danger being avoided by the spraying of a moistened dust having a tendency to settle more rapidly.

Another object of the invention is to provide a means for spraying dust and liquid insecticides from planes which will be much safer to handle and to load into a plane since the dust may be a neutral material while the insecticide may be in liquid form only.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of a conventional plane employed for dusting operations of crops and the like, a part of the plane being omitted and other parts being broken away in section and showing the dusting apparatus in accordance with this invention applied thereto;

Figure 2 is a fragmentary bottom plan view of the arrangement of Figure 1 and showing particularly the disposition of the dust discharge nozzle and of the liquid spray atomizing nozzle of the invention;

Figure 3 is a vertical transverse sectional view taken substantially upon the plane indicated by the section line 3—3 of Figure 1;

Figure 4 is a detail view partly in elevation and partly in vertical section showing the liquid spray control valve and its operative association with the spray control lever of the invention;

Figure 5 is a view similar to Figure 1 but of a slightly modified construction of the dust and liquid discharge nozzles;

Figure 6 is a bottom plan view of the arrangement in Figure 5; and

Figure 7 is a vertical transverse sectional view taken substantially upon the plane indicated by the section line 7—7 of Figure 5.

In the aerial spraying of crops with various insecticides, commonly known as dusting operations, it is conventional to employ a liquid insecticide together with a neutral or inert dust mixed with the same prior to the spraying of this mixture from an aircraft. It is generally recognized that a dust and liquid mixture produces superior results in spraying, over the spraying of a powder insecticide alone, or the spraying of a liquid insecticide alone, inasmuch as the powder insecticide does not adhere as readily to the surface of the plants being treated, while the liquid insecticide is very difficult to economically distribute homogeneously and uniformly over the entire area being treated. Moreover, where powder insecticides are employed, the powder tends to hang in the air as a cloud, thereby rendering it a source of danger to a pilot since on his next pass across the field his vision is obscured at least to some extent by this cloud of powder, and there is also considerable danger that he may inhale some of the same. When it is recognized that spraying operations are performed usually at altitudes of about 4 to 10 feet from the ground, the disadvantages of this method of spraying will be readily apparent.

In order to overcome these difficulties, the industry of aerial insecticide spraying now customarily mixes an inert or neutral powder with a liquid insecticide. The moistening of the dust tends to make it adhere more satisfactorily to the foliage of plants being treated, while the dust itself acts as a carrier for the liquid insecticide enabling it to be more uniformly defused through the air and upon the crop being treated. However, where the powder is mixed with the insecticide prior to loading of the containers of the plane, it is obvious that considerable labor will be necessary for this purpose and the actual mixing itself presents a hazard to persons performing the same. In addition, the passage of the moistened dust through the control valve means of the spraying apparatus tends to clog the same. Further, it is very difficult to atomize or intimately mix the moistened dust particles with the atmosphere as the same leaves a plane.

The present invention aims to overcome all of the above mentioned disadvantages by the provision of separate hoppers or containers in a plane for the inert or neutral dust and for the liquid insecticide, together with individual control means for feeding a desired quantity and in a variable quantity each of the components from their containers to the spraying apparatus of the plane. Further, the present invention separately atomizes on the exterior of the plane each component in an air stream, and thereafter intermingles and mixes the two separate air streams laden with these components to effect the final mixing of the liquid and the dust exteriorly of the plane during the spraying operation.

In the embodiment of Figure 1, the numeral 10 designates generally a conventional type of aircraft customarily employed for dusting operations, the plane having a fuselage or body 12 with an undersurface 14. Disposed within the plane fuselage is a hopper 16 containing a powder 18 which may preferably consist of an inert or neutral dust, but may in some instances consist of a powdered insecticide if desired. Also disposed within the plane is a tank 20 adapted to contain a liquid insecticide as at 22 to be mixed with the powder 18 to form an insecticidal moistened dust.

Shown at 24 is an opening in the bottom surface 14 of the fuselage and through which the discharge spout 26 of the hopper 16 communicates, a conventional form of gate valve 28 having a pivot pin 30 to which is secured an operating crank 32, being provided. The arrangement is such that when the gate valve is opened dust 18 will descend through the discharge spout 26 of the hopper, through the opening 24 in the bottom surface 14 of the plane fuselage and be delivered to the exterior thereof. The suitably shaped curved plate 34, see also Figures 2 and 3, is mounted beneath the fuselage bottom surface 14 and is shaped to provide a venturi 36 lying between this plate and the fuselage. This venturi has an outwardly flaring inlet opening 38 at one end and a considerably larger outwardly flaring discharge opening 40 at the rearward end of the same. The opening 38 is disposed in the direction of travel of the plane so that the slip stream of the plane will pass therethrough, and at the narrow or throat portion 42 of the venturi the discharge spout 26 and the opening 24 of the fuselage bottom surface 14 are positioned. Consequently as the dust is discharged by means of the control valve into the throat of the venturi, it mixes and is mingled with the air stream passing therethrough to be thoroughly atomized thereby, it being particularly noted that the dust is still in its dry state. Consequently, a cloud of dust will then be discharged from the outlet 40 of the venturi in a direction rearwardly of the plane as indicated by the dotted line showing in Figure 1.

Also mounted upon the fuselage of the plane and lying beneath the same and also beneath the plate 34 forming the venturi is a transversely extending spray pipe 44 having a plurality of orifices 46 directed rearwardly of the same and constituting the spray nozzles of the pipe. It will be observed that this pipe extends substantially entirely across the width of the venturi for outlet 40 but is positioned therebeneath. A baffle or deflector 48 is also mounted beneath the fuselage of the plane, consisting of a V-shaped member having its apex disposed closely adjacent the orifices 46. The arrangement is such, as shown in Figure 1 in particular, that the liquid spray will impinge upon the apex of the deflector 48, and will tend to be diverted or spread thereby. The air stream passing below the venturi element 34 owing to the slip stream of the plane will pick up and strike this deflected liquid spray, thereby completely atomizing the same. The cloud of atomized liquid spray will then mingle with the previously mentioned atomized cloud of dust as shown in dotted lines in Figure 1 so that the two atomized components will then thoroughly intermix and intermingle with each other.

Thus, it will be apparent that the atomization of each of the components of the spray is effective separately and upon the exterior of the plane; and that the combination of the atomized components is likely performed exteriorly of the plane. This ensures a more thorough and complete atomization of the components and a more thorough and complete mixing of the same immediately prior to their application to the crops being treated by the plane.

Referring now especially to Figure 1 it will be observed that there is provided a manually operated spray control lever 50 pivoted by a pivot pin 52 upon a support or bracket 54 suitably mounted in the fuselage of the plane in a position to be operated by the pilot. By means of a quadrant 56 and a suitable detent structure 58 on the lever 50, the latter may be secured in various adjusted positions.

The lever in turn is pivoted at 60 to a link 62 connected to a bell crank 64 journaled as at 66 upon a further support bracket 68. The bell crank is also pivoted to a further connecting rod or link 70 which in turn is pivoted to the crank arm 32 previously mentioned. Thus, it will be apparent that manipulation of the lever 50 will manually open or close the gate valve 26 of the hopper 16 and thereby regulate the feed of the powder 18 into the dust or powder atomizing venturi.

A liquid supply line 72 is connected to the insecticide storage tank 20 and is provided with a manual control valve 74 whereby the supply of liquid insecticide may be completely cut off, or may have its flow accurately regulated by means of this control valve. The line 74 preferably goes to a conventional form of pump 76 driven by a propeller 78 suitably disposed in the slip stream of the airplane, and by means of a further line 80 this fuel is delivered to a control valve 82. From the latter a line 84 delivers the fuel to the previously mentioned spray nozzle head 44.

Referring now especially to Figure 4 it will be observed that the lever 50 has a laterally projecting cam or lug 86 by which the lever actuates the control valve 82 in unison with operation of the control gate 26. The valve 82 includes a casing having a cylindrical bore 88 therein in which is reciprocably mounted a piston valve 90. This valve has a stem 92 extending through an externally threaded and centrally bored guide bushing 94, the stem 92 being engaged by the cam member 86. A spring 96 yieldingly urges the piston valve into an upward position, in which upward position it will uncover the intake port 98 which is supplied with insecticide by the line 80 previously mentioned. The delivery line 84 communicates with the bottom of the bore 80 below the piston valve.

As so far described, it is believed that the operation of this spraying device in accordance with this form of the invention will now be readily understood. The dust 18 is separately loaded into the hopper 16, and the insecticide 22 is then supplied into the tank 20. When it is ready to discharge the insecticide from the plane, the control valve 74 is opened to permit flow at a predetermined rate from the liquid tank 22 to the pump 76 and from the latter to the manual control valve 82. Thereafter, the lever 50 is manipulated to simultaneously control feeding of the powder or dust 18 from the hopper 16 through the control gate 26, and liquid from the supply tank to the control valve 82. The dust so fed will be discharged into the venturi to be thoroughly atomized by the air flowing therethrough and delivered in the form of a cloud of dry dust rearwardly of the plane. At the same time, the liquid will be pumped through the control valve 82 to the spray head 44 and through the series of nozzles 46 against the deflector bar 48 to thus produce a thoroughly atomized stream of liquid extending transversely across the entire width of the atomized dust. Thereafter, the two atomized clouds of dust and liquid will mingle with each other, thereby moistening the dust to the desired degree for most effective treatment of the crops by the plane.

Shown in Figures 5–7 is a somewhat modified construction. In this form the plane 10 and its fuselage 12 with its bottom surface 14 is likewise provided with the dust hopper 16 and with the liquid insecticide tank 20. Further, the opening 24 in the bottom surface 14 is likewise controlled by a gate 26 through the agency of the control lever 32. As in the previous form, the lever 50, journal 52 upon the bracket 54 is provided with the quadrant 56 and detent 58 and is connected at 60 to a link 62 which is secured to a bell crank 64 journaled at 66 upon a further bracket 68. The bell crank by means of the link 70 is then connected to the crank arm 32. This linkage, which is identical with that set forth in the previous embodiment serves to simultaneously control the feeding of dust from the hopper 16 and the flow of liquid insecticide. For this latter purpose, the same supply line 72 and manual control valve 74 is provided, with the lever likewise having a cam lug 86 which controls the stem 92 of the valve element in a valve casing 82. However, in this form a gravity feed is provided between the valve 82 and the discharge nozzles. Consequently, the pump 76 and its driving propeller 78 are omitted, the outlet of a tubing directly connected as by a conduit 84 to a transversely extending spray header 100. The latter is provided with a plurality of rearwardly extending spray nozzles 102 of any conventional type, the header and its spray nozzles being in turn disposed between the venturi member 34 and a further venturi member 104 disposed therebeneath. The members 34 and 104 are so shaped as to provide an enlarged air inlet as at 106, a neck or throat portion 108, and an enlarged outlet 110. The spray head and nozzles are disposed in the throat 108.

In the embodiment of Figure 5 it will be observed that both the dust venturi and the liquid venturi receive the slip stream air from the passage of the plane, in order that the dust and the liquid may be separately atomized in these venturi and discharged rearwardly therefrom where they mingle in a manner previously set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aerial insecticide apparatus comprising a dust hopper and a liquid insecticide tank mounted in a plane fuselage, an air and dust mixer and a liquid and air mixer each disposed below said fuselage, supply means extending from said hopper and tank to said mixers respectively for delivering dust and liquid respectively from said hopper and said tank to said mixers whereby atomized dust and atomized liquid may be intermixed exteriorly of and sprayed by a plane, one of said mixers comprising a venturi having a bottom plate of compound curvature forming an intermediate restricted throat in the venturi into which the dust is delivered, control means for simultaneously controlling the flow of dust and liquid insecticide comprising valves in the supply means extending from said hopper and tank respectively, and manual means connected to said valves to operate the same in unison.

2. An aerial insecticide apparatus comprising in combination with a plane fuselage a dust hopper and a tank for liquid insecticide, a plate of compound curvature disposed beneath said fuselage and forming therewith a venturi having an intermediate restricted throat and an air inlet for receiving a flow of air created by the travel of said plane, means extending from said hopper to said throat and delivering dust from said hopper to the throat of said venturi, means beneath said venturi and rearwardly thereof for mixing air and liquid insecticide, means extending from said tank to said means for mixing air and liquid insecticide and delivering insecticide from said tank to said mixing means, said dust and air mixture and said liquid insecticides and air mixture being intermixed beneath said fuselage, control means for simultaneously controlling the flow of dust and liquid insecticide comprising valves in the supply means from said hopper and tank respectively, and manual means connected to said valves to operate the same in unison.

3. An aerial insecticide apparatus including in combination with a plane having a fuselage, a dust hopper and a liquid insecticide tank in said fuselage, a pair of venturis mounted beneath said fuselage disposed for passage of air therethrough by passage of said plane, supply means extending from said hopper and tank to said venturis respectively, and connecting said hopper to one venturi and said tank to the other venturi, the air mixtures discharged by said venturis being intermixed rearwardly therefrom, control means in said supply means for simultaneously regulating the flow from said hopper and tank, said venturis having intermediate restricted throats respectively, into which said supply means discharge, the throat of one venturi being behind the other throat.

4. The combination of claim 3 wherein said pair of venturis have a common wall therebetween of compound curvature coacting with other walls of the venturis to form said throats.

5. An aerial insecticide apparatus comprising in combination with a plane fuselage a dust hopper and a tank for liquid insecticide, a plate of compound curvature disposed beneath said fuselage and forming therewith a venturi having an intermediate restricted throat and an air inlet for receiving a flow of air created by the travel of said plane, means extending from said hopper to said throat and delivering dust from said hopper to the throat of said venturi, means beneath said venturi and rearwardly thereof for mixing air and liquid insecticide, means extending from said tank to said means for mixing air and liquid insecticide and delivering insecticide from said tank to said mixing means, said dust and air mixture and said liquid insecticides and air mixture being intermixed beneath said fuselage, said insecticide delivery means including a transverse header having a plurality of discharge ports, a transverse baffle element disposed parallel and rearwardly adjacent said header for dispersing the streams of liquid from said header.

References Cited in the file of this patent

UNITED STATES PATENTS

| | | |
|---|---|---|
| 1,722,467 | Huff | July 30, 1929 |
| 1,957,075 | Morgensen | May 1, 1934 |
| 2,395,827 | Husman et al. | Mar. 5, 1946 |
| 2,626,769 | Wadman | Jan. 27, 1953 |
| 2,659,556 | Doblhoff | Nov. 17, 1953 |
| 2,715,792 | Magnusson | Aug. 23, 1955 |
| 2,772,061 | Sellers | Nov. 27, 1956 |

FOREIGN PATENTS

| | | |
|---|---|---|
| 168,078 | Great Britain | June 23, 1921 |
| 290,666 | Great Britain | Aug. 9, 1929 |